United States Patent
Øvrebø et al.

(10) Patent No.: US 12,168,852 B2
(45) Date of Patent: Dec. 17, 2024

(54) PROCESS AND SYSTEM FOR INCREASING THE SOLIDS CONTENT OF MICROFIBRILLATED CELLULOSE

(71) Applicant: Borregaard AS, Sarpsborg (NO)

(72) Inventors: Hans Henrik Øvrebø, Sarpsborg (NO); Seid Ali Moosavi Far, Sarpsborg (NO)

(73) Assignee: Borregaard AS, Sarpsborg (NO)

( * ) Notice: Subject to any disclaimer, the term of this patent is extended or adjusted under 35 U.S.C. 154(b) by 476 days.

(21) Appl. No.: 17/311,667

(22) PCT Filed: Dec. 19, 2019

(86) PCT No.: PCT/EP2019/086200
§ 371 (c)(1),
(2) Date: Jun. 7, 2021

(87) PCT Pub. No.: WO2020/127658
PCT Pub. Date: Jun. 25, 2020

(65) Prior Publication Data
US 2023/0160145 A1 May 25, 2023

(30) Foreign Application Priority Data
Dec. 20, 2018 (EP) .................................... 18214966

(51) Int. Cl.
*D21H 11/18* (2006.01)
*D21C 9/18* (2006.01)

(52) U.S. Cl.
CPC ............... *D21H 11/18* (2013.01); *D21C 9/18* (2013.01)

(58) Field of Classification Search
CPC .......... D21H 11/18; D21H 11/08; D21C 9/18; C08L 1/02; F26B 17/023; F26B 5/12; C08B 1/003
See application file for complete search history.

(56) References Cited

U.S. PATENT DOCUMENTS

| 4,341,807 A | 7/1982 | Turbak et al. |
| 4,374,702 A | 2/1983 | Turbak et al. |
| (Continued) | | |

FOREIGN PATENT DOCUMENTS

| BR | 102015017614 A2 | 8/2018 |
| CN | 101089284 A | 12/2007 |
| (Continued) | | |

OTHER PUBLICATIONS

Everett, D.H., Iupac "Gold Book" Manual of Symbols and Terminology for Physicochemical Quantities and Units, Appendix 2 Definitions, Terminology and Symbols in Colloid and Surface Chemistry, 31(577):606, (1972).

(Continued)

*Primary Examiner* — Jacob T Minskey
*Assistant Examiner* — Matthew M Eslami
(74) *Attorney, Agent, or Firm* — Choate, Hall & Stewart LLP; Michael D. Schmitt

(57) ABSTRACT

The present invention relates to a process and a system for the at least partial removal or exchange of solvent from/in a suspension comprising microfibrillated cellulose (MFC), specifically the at least partial removal of solvent from a suspension comprising microfibrillated cellulose having a comparatively high solvent (water) content to a relatively lower solvent content. Accordingly, the solids content of the microfibrillated cellulose increases during the the step of at least partial removal of solvent from a suspension comprising process, in particular from a first solids content in the range of from 0.1% weight by weight ("w/w") to 6% w/w, preferably 1% weight by weight ("w/w") to 5% w/w, up to a second solids content of above 5% w/w, preferably to a solids content of from above 5% w/w-50% w/w, further preferably to a solids content of from above 5% w/w-25% w/w. In a separate aspect, a solvent exchange step after the (Continued)

Figure 1:
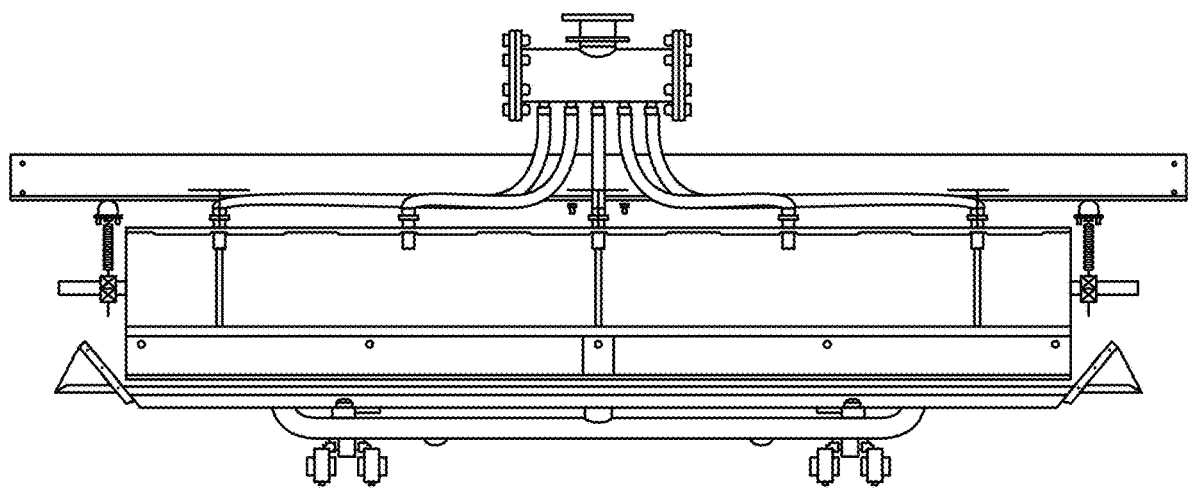

at least partial removal of a first solvent is also part of the present invention.

11 Claims, 7 Drawing Sheets

(56) References Cited

U.S. PATENT DOCUMENTS

| | | | |
|---|---|---|---|
| 4,481,077 | A | 11/1984 | Herrick |
| 5,385,640 | A | 1/1995 | Weibel et al. |
| 10,618,015 | B2 | 4/2020 | Guerin et al. |
| 2016/0227782 | A1 | 8/2016 | Oevreboe et al. |
| 2017/0121908 | A1 | 5/2017 | Holtan et al. |
| 2018/0274173 | A1 | 9/2018 | Holtan et al. |
| 2019/0284762 | A1 | 9/2019 | Holtan et al. |
| 2020/0248042 | A1 | 8/2020 | Holtan et al. |
| 2020/0263358 | A1* | 8/2020 | Windebank ............ D21H 17/69 |
| 2021/0261831 | A1 | 8/2021 | Holtan et al. |

FOREIGN PATENT DOCUMENTS

| | | | |
|---|---|---|---|
| CN | 203980835 U | 12/2014 | |
| JP | 2013-136859 A | 7/2013 | |
| JP | 2018-517853 A | 7/2018 | |
| JP | 2018/172801 A | 11/2018 | |
| WO | WO-2005/028752 A1 | 3/2005 | |
| WO | WO-2007/091942 A1 | 8/2007 | |
| WO | WO-2013/022025 A1 | 2/2013 | |
| WO | WO-2015/180844 A1 | 12/2015 | |
| WO | WO-2017154568 A1 * | 9/2017 | ............. B01F 11/02 |
| WO | WO-2018/002815 A1 | 1/2018 | |
| WO | WO-2018/193314 A1 | 10/2018 | |

OTHER PUBLICATIONS

International Search Report for PCT/EP2019/086200 filed Dec. 19, 2019, 3 pages, (Mar. 24, 2020).

Written Opinion for PCT/EP2019/086200 filed Dec. 19, 2019, 6 pages, (Mar. 24, 2020).

* cited by examiner

PROCESS AND SYSTEM FOR INCREASING THE SOLIDS CONTENT OF MICROFIBRILLATED CELLULOSE

FIELD OF THE INVENTION

The present invention relates to a process for the at least partial removal of solvent from a suspension comprising microfibrillated cellulose (MFC), specifically the at least partial removal of solvent, in particular water, from a suspension comprising microfibrillated cellulose, wherein the suspension changes from a comparatively high solvent content, in particular water content, to a relatively lower solvent content. Accordingly, the solids content of the microfibrillated cellulose increases during the at least partial removal of solvent, in particular from a first solids content of microfibrillated cellulose in the range of from 0.1% weight by weight ("w/w") to 6% w/w, preferably from 1% w/w to 5% w/w, further preferably from 1.5% w/w to 3.5% w/w. up to a second solids content of microfibrillated cellulose of 5% w/w or above, preferably to a solids content of microfibrillated cellulose of from 5% w/w-50% w/w, further preferably to a solids content of microfibrillated cellulose of from 6% w/w-30% w/w, more preferably to a solids content of microfibrillated cellulose of from 7% w/w-20% w/w, wherein the second solids content is higher than the first solids content.

The present invention also relates to a system for the at least partial removal of solvent from a suspension comprising MFC, wherein said system comprises microfibrillated cellulose having a solids content of microfibrillated cellulose in the range of from 0.1% weight by weight ("w/w") to 6% w/w, a substrate for accommodating said microfibrillated cellulose, wherein said substrate is at least partly apertured, further wherein said system comprises at least one device for subjecting said microfibrillated cellulose, while accommodated onto said substrate, to a vacuum, i.e. to a pressure lower than ambient pressure.

BACKGROUND OF THE INVENTION

Microfibrillated cellulose (also known as "reticulated" cellulose or as "superfine" cellulose, or as "cellulose nanofibrils", among others, and as referred to as "MFC" in the following) is a cellulose-based product and is described, for example, in U.S. Pat. Nos. 4,481,077, 4,374,702 and 4,341,807. According to U.S. Pat. No. 4,374,702 ("Turbak"), microfibrillated cellulose has reduced length scales (diameter, fibril length) vis-à-vis cellulose fibers, improved water retention and adjustable viscoelastic properties. MFC with further improved properties and/or properties tailor-made for specific applications is known, among others, from WO 2007/091942 and WO 2015/180844.

Microfibrillated cellulose (MFC) is a valuable product derived from cellulose and is commonly manufactured in a process in which cellulose fibers are opened up and unraveled to form fibrils and microfibrils/nanofibrils by (repeated) passage through a geometrical constraint. For example, MFC may be produced as disclosed in WO 2015/180844 by passing a liquid composition (suspension) of cellulose through a small diameter orifice in which the composition is subjected to a pressure drop of at least 1000 psig and a high velocity shearing action followed by a high velocity decelerating impact. The passage of said composition through said orifice is repeated until the cellulose composition becomes a substantially stable composition. This process converts the cellulose into microfibrillated cellulose, which has valuable physical properties (gel forming capability, thixotropic properties, high water retention value WRV etc.) without substantial chemical change of the cellulose starting material.

Another process for manufacturing microfibrillated cellulose is described in U.S. Pat. No. 5,385,640 ("Weibel"). Weibel provides a relatively simple and inexpensive means for refining fibrous cellulosic material into a dispersed tertiary level of structure and thereby achieving the desirable properties attendant with such structural change. The cellulosic fiber produced in this way is referred to as "microdenominated cellulose (MDC)", a sub-group of microfibrillated cellulose. Therein, microfibrillated cellulose is obtained by repeatedly passing a liquid composition of fibrous cellulose through a zone of high shear, which is defined by two opposed surfaces, with one of the surfaces rotating relative to the other, under conditions and for a length of time sufficient to render the composition substantially stable and to impart to the composition a water retention that shows consistent increase with repeated passage of the cellulose composition through the zone of high shear. This process increases the viscosity and leads to a gel structure, until no further increase in viscosity is achieved. After such a treatment, homogeneous MFC is obtained and the conversion of cellulose to microcellulose as such is concluded.

Generally, prior to transport of MFC, in particular the transport of larger amounts of MFC to the point-of-use, solvent needs to be removed from microfibrillated cellulose. In particular, if water is the solvent, microfibillated cellulose needs to be at least partly dewatered before transport to the point-of-use, to minimize logistics and storage expenses. However, in order to be valuable to customers, for example in the food industries or in the paint industries, microfibrillated cellulose should be provided and transported at a solvent content that does not lead to significant loss of properties when adjusting the final desired solvent content at the point-of-use. In particular, the step/process of partial removal and/or exchange of solvent from a suspension comprising MFC should not lead to a significant loss of viscosity respectively gel-like structure, vis-à-vis microfibrilled cellulose as initially obtained (before transport and/or before any removal of solvent). In case such a solvent (water) removal is not performed in a way that prevents aggregation of microfibrils, some of the performance characteristics of the MFC may be diminished or lost at the point-of-use.

Conventional processes used for removing solvent from a suspension comprising microfibrillated cellulose include, among others, freeze-drying the gel using liquid nitrogen (for freezing) and drying via sublimation. While these processes can be suitably implemented on the laboratory stage, high costs for liquid nitrogen and high vacuum required for sublimation render these processes prohibitive for commercial implementation for effectively separating MFC from large amounts of liquid. Additionally, long processing times add operational costs. Another process for removing solvent (water) from MFC is described in WO 2005/028752. Therein, the suspension of MFC is first dewatered by compression means and MFC is then dried in a conventional drying oven operating at a temperature of 60° C. to 120° C.

Solvent/water removal as known from the art may not always be reproducible in the sense that the "concentrated" suspension may not necessarily lead, after reconstitution (dilution with the same or a different solvent), to MFC end products that have specified properties after dilution. In some cases, solvent removal may lead to a deterioration of MFC properties, for example significant loss of the solvent/water retention properties of MFC.

As mentioned above, MFC is characterized, among others, by a (comparatively) high solvent/water retention capacity. However, it is generally challenging to remove solvent/water from a product that has a high solvent/water retention capacity. The inventors have found that using conventional filtering methods, in particular press filtering as known from the art, does not lead to satisfactory results for the removal of solvent from a suspension comprising microfibrillated cellulose.

Therefore, one object to be addressed by the present invention in view of the known prior art is to provide a process for the at least partial removal of solvent, in particular water, from a suspension comprising microfibrillated cellulose that avoids or mitigates the problems or shortcomings described above.

SUMMARY OF THE PRESENT INVENTION

In accordance with the present invention, at least a subset of the above-stated problems is solved by a process for the at least partial removal of solvent from a suspension comprising microfibrillated cellulose, wherein the solids content of the microfibrillated cellulose increases, during the at least partial removal of solvent, from a first solids content of microfibrillated cellulose in the range of from 0.1% weight by weight ("w/w") to 6% w/w, preferably from 1% w/w to 5% w/w, further preferably from 1.5% w/w to 3.5% w/w, up to a second solids content of microfibrillated cellulose of 5% w/w or above, preferably to a solids content of microfibrillated cellulose of from 5% w/w-50% w/w, further preferably to a solids content of microfibrillated cellulose of from 6% w/w-30% w/w, more preferably to a solids content of microfibrillated cellulose of from 7% w/w-20% w/w, wherein the second solids content is higher than the first solids content, wherein said process comprises at least the following steps:
  (i) providing microfibrillated cellulose in a solvent, preferably water, wherein the solids content of microfibrillated cellulose is in the range of 0.1% weight by weight ("w/w")-6% w/w, preferably 1% w/w-5% w/w, further preferably 1.5% w/w-3.5% w/w;
  (ii) applying said microfibrillated cellulose from step (i) onto an at least partly apertured substrate and subjecting the microfibrillated cellulose, while applied onto said apertured substrate, to a vacuum, i.e. a pressure that is reduced vis-à-vis the respective ambient pressure;
  (iii) optionally rotating at least one segment of said apertured substrate at least once by 360 degrees, thereby removing microfibrillated cellulose of an increased solids content from the apertured substrate.

In accordance with the present invention, the "solids content" of MFC is given in % weight of solids vis-à-vis the overall weight of the composition including solvent (water).

In accordance with the present invention, after step (ii), or after step (iii), the second solids content of microfibrillated cellulose in the suspension of MFC in a solvent (preferably in water) is 5% w/w or above, preferably from 5% w/w-50% w/w, further preferably from 6% w/w-30% w/w, more preferably from 7% w/w-20% w/w.

In preferred embodiments of the invention, the at least partial removal of solvent from a suspension comprising microfibrillated cellulose is a "dewatering" of the microfibrillated cellulose, i.e. is the at least partial removal of water or of a solvent comprising at least 90% of water, preferably at least 95% of water In embodiments of the invention, during or after step (ii), the microfibrillated cellulose of increased solids content [vis-à-vis the microfibrillated cellulose from step (i)] is subjected to a step (iv) of adding at least one solvent to the mixture of step (ii), wherein said solvent is different from the solvent of step (i).

Accordingly, the object(s) underlying the present invention is/are also solved by a process for the at least partial exchange of solvent in a suspension comprising microfibrillated cellulose, wherein said process comprises at least the following steps:
  (i) providing microfibrillated cellulose in a first solvent, preferably water, wherein the solids content of microfibrillated cellulose is in the range of 0.1% weight by weight ("w/w")-6% w/w, preferably 1% w/w-5% w/w, further preferably 1.5% w/w-3.5% w/w;
  (ii) applying said microfibrillated cellulose from step (i) onto an at least partly apertured substrate and subjecting the microfibrillated cellulose, while applied onto said apertured substrate, to a vacuum, i.e. a pressure that is reduced vis-à-vis the respective ambient pressure;
  (iii) optionally rotating at least one segment of said apertured substrate at least once by 360 degrees, thereby removing microfibrillated cellulose of an increased solids content from the apertured substrate;
  (iv) adding at least one second solvent to the mixture of step (ii), during or after step (ii), wherein said second solvent is different from the first solvent of step (i).

In embodiments, after solvent exchange step (iv), the MFC solids content is higher than the MFC solids content of the suspension provided in step (i). However, it is fully within the scope of the present invention that the solids content achieved after said step (iv) is the same or is lower than the solids content of the MFC suspension in step (i).

In accordance with the present invention, "apertures" are openings in the substrate that allow for the removal of water from the microfibrillated cellulose as present (applied) onto the substrate, in particular by means of applying a vacuum underneath the substrate.

In embodiments, said apertures (openings, through-holes) extend through the entire thickness of the substrate.

In embodiments of the present invention, said apertured substrate comprises a polypropylene or polyethylene filament-weaving, either as single- or multiple layer, but may also be needled with base fabric.

In embodiments of the present invention, the thickness of said apertured substrate ranges from 200 μm to 2000 μm.

In embodiments of the present invention, the tensile strength of said apertured substrate is at least 80 kN/m, either as measured lengthwise or as measured crosswise.

In embodiments, the air-permeability of said apertured substrate, as commonly used as a measure of the substrate's degree of "openness", is from 5 to 1500 $L/m^2*s$, preferably from 5 to 250 $L/m^2*s$, more preferably from 10 to 100 $L/m^2*s$ (measured at 2 mbar vacuum), as measured in accordance with ASTM D737-18, «Standard Test Method for Air Permeability of Textile Fabrics"

The density and size of the apertures in the substrate is chosen to balance the solvent removal capacity with loss of fibrils through the apertured substrate (if the apertures are chosen to be too small, the vacuum may not work efficiently, if the apertures are chosen to be too large, too many fibrils may be lost).

In embodiments of the present invention, the vacuum as applied in step (ii) is from 0.1 mbar to 800 mbar, preferably from 5 mbar to 700 mbar, further preferably from 20 mbar to 700 mbar, further preferably from 100 mbar to 600 mbar.

In embodiments of the present invention, said vacuum is applied to an area of the substrate that covers from 1 to 1000 m$^2$ or from 2 to 100 m$^2$, preferably from 4 to 80 m$^2$ Examples of suitable materials for apertured substrates include but are not limited to:
Valmet: S4152-L2K2-M2, S1152-L2K2-M7, S5118-L1K3, S5111-L1, 52121-L2K2, Sefar:
Tetex DLW 07-8435-SK010, MARO, Outotec: S25, S30, S35, S50, S60.

In accordance with the present invention, the optional step that said apertured substrate "rotates" at least once by 360 degrees means that a given segment of the substrate is subjected to a movement that covers an angular range of 360 degrees in space (wherein said angular range is by no means limited to a circle but may be any conceivable spatial arrangement that can be described by a vector).

In preferred embodiments, said rotating substrate is realized as a rotating belt.

In embodiments of the present invention, said apertured substrate continuously rotates by 360 degrees, at least 5 times, preferably at least 50 times, further preferably at least 100 times, in step (iii).

In embodiments of the present invention, the thickness of the layer of microfibrillated cellulose as applied/accommodated onto said apertured substrate, after step (ii), is from 1 mm to 200 mm, preferably from 2 mm to 100 mm, further preferably from 3 mm to 50 mm, even further preferably from 4 mm to 20 mm, further preferably from 5 mm to 12 mm.

Adjusting the (comparatively small) thickness of the layer as found in accordance with the present invention is advantageous since this avoids or minimizes the building-up of a significant gradient of solids content across the layer/cake (a large gradient may render the product inhomogeneous and/or the solvent removal/dewatering less effective). If the layer is too thin, cavities are formed in the layer and it may be difficult to maintain the desired pressure.

In embodiments of the present invention, the time period that a given portion of microfibrillated cellulose remains applied/accommodated on said substrate is from 5 sec to 1000 sec, preferably from 10 sec to 700 sec.

In embodiments of the invention, prior to step (i), the microfibrillated cellulose the microfibrillated cellulose is contained, for a predefined time segment, in a container, preferably a feeding tray. This feeding tray may be subjected to a vacuum or to a pressure higher than ambient pressure, in order to control the feeding rate.

In embodiments of the invention, the solvent/water retention capacity of the microfibrillated cellulose after step (iii) is at least 70% of the solvent/water retention capacity of the microfibrillated cellulose as initially provided in step (i), preferably at least 80%, more preferably at least 90%.

In embodiments of the invention, the microfibrillated cellulose, after step (iii) has a solvent/water retention capacity (solvent/water holding capacity) of more than 50, preferably more than 60, further preferably more than 70. In embodiments of the invention, the MFC, after step (iii), has a solvent/water retention capacity of 40-250, preferably 50-150, further preferably 60-100.

The solvent/water retention capacity (also referred to as "solvent/water holding" capacity) describes the ability of the MFC to retain solvent (e.g. water) within the MFC structure, essentially relating to the accessible surface area. In accordance with the present invention, the solvent/water retention capacity is measured by diluting a given MFC sample to a 0.3% solids content of microfibrillated cellulose in solvent and then centrifuging the samples at 1000 G for 15 minutes. The clear solvent phase was separated from the sediment and the sediment was weighed. The solvent/water retention capacity is given as (mV/mT)-1 where mV is the weight of the wet sediment and mT is the weight of dry MFC analyzed.

In embodiments of the present invention, the at least partial removal of solvent from a suspension comprising MFC leads to an MFC suspension, after step (ii) or step (iii), which has a complex viscosity in PEG of from 20 Pa s-100 Pa s, preferably 30 Pa s-90 Pa s.

The values for the complex viscosity as found for MFC after (partial) solvent (water) removal, in accordance with the present invention, show that the thickening effect of the MFC is maintained after the solvent removal process of the present invention maintains an.

The complex viscosity in PEG or "PEG viscosity" as used in accordance with the present invention is measured with PEG400 as the solvent at a dosage of 0.65% MFC in PEG/water. The concentration of PEG and water in the suspension, respectively, is 60% and 39%. "PEG 400" is a polyethylene glycol with a molecular weight between 380 and 420 g/mol and is widely used in pharmaceutical applications and therefore commonly known and available. The complex viscosity was measured on a rheometer of the type Anton Paar Physica MCR 301. The temperature in all measurements was 25° C. and a "plate-plate" geometry was used (diameter: 50 mm). The rheological measurement was performed as an oscillating measurement (amplitude sweep), and the complex viscosity in the plateau of the amplitude sweep is measured.

Examples of particle size, viscosity and water retention value as measured before (2% MFC solids content) and after (10% MFC solids content) the step of at least partial removal of solvent from a suspension comprising MFC, in accordance with the present invention (see Examples for a detailed description of said process) are given in the following table:

| Batch | Average particle size (μm) | PEG viscosity (Pa*s) | Brookfield viscosity (Pa*s) | WRV (g/g) |
|---|---|---|---|---|
| MFC "P" before the at least partial removal of solvent | 58 | 38 | 22 | 67 |
| MFC "P" after the at least partial removal of solvent | 60 | 37 | 23 | 70 |
| MFC "F" before the at least partial removal of solvent | 34 | 54 | 31 | 83 |
| MFC "F" after the at least partial removal of solvent | 36 | 61 | 30 | 101 |

Particle size distribution was measured by laser diffraction (Microtrac S3500) and the average particle size reported refers to the mean volume diameter (MV).

Viscosity in water was measured at 2% (w/w) using a Brookfield instrument with a vane spindle (V73) at 10 rpm with 5 min measurement time.

For analyzing MFC after solvent removal (dewatering), the samples are diluted with deionized water to a concentration of 2% (w/w) using moderately high shear (UltraTurrax T25, 10 000 rpm, 4 min, 250 ml), prior to analyzing VVRV, viscosity, and particle size.

After solvent has been removed from microfibrillated cellulose, for example in a dewatering process, high shear forces are often needed for diluting the samples (at the point-of-use) to assure proper dispersion. The extent of physical changes like formation of secondary bonds and aggregation during solvent removal (dewatering), among others, will determine the shear needed to regain the physical properties prior to drying.

When using the process according to the present invention, the physical properties of the MFC as it existed prior to the process of solvent removal in accordance with the present invention are partly or fully regained using moderate to high shear to re-disperse the MFC in its state of increased MFC solids content, i.e. after the removal or the exchange of solvent.

Microfibrillated cellulose" (MFC) in accordance with the present invention is to be understood as relating to cellulose fibers that have been subjected to a mechanical treatment resulting in an increase of the specific surface and a reduction of the size of cellulose fibers, in terms of cross-section (diameter) and/or length, wherein said size reduction preferably leads to "fibrils" having a diameter in the nanometer range and a length in the micrometer range.

In embodiments of the invention, the solvent is a hydrophilic solvent, preferably a polar solvent, further preferably a protic solvent. Preferred solvents are water or alcohol (e.g. ethanol, methanol, iso-propanol, butanol), or glycols and glycol ethers, or any mixture of such solvents.

Aprotic (including non-polar) solvents may also be present, for example ethyl acetate, DMSO, acetone or 1,4 dioxane.

In accordance with the present invention, whenever reference is made to "water" and "dewatering", embodiments in which parts of the water, or up to 10% of the water, preferably up to 5% of water is replaced by any other conceivable solvent that is suitable to maintain MFC suspensions or gels is also included. Suitable solvents of that kind are the solvents as discussed above.

"Water" can be distilled water, processed water or tap water as commonly used in industrial applications.

In accordance with the present invention, other components or additives may be present in the suspension of MFC, or may be added to the same, before, during and/or after the step at least partial removal of solvent from a suspension comprising MFC, i.e. any or all of steps (i) through (iv).

Such additives or other additives may be ethylene glycols, glycerols, salts, cellulosic materials, cellulose derivatives, fillers, surfactants, pigments, natural or synthetic polymers such as xyloglucans, hydrocolloids gums, starches, sugars, sugar alcohols, PEGs. Inorganic particulate material useful as additives may include clay, pigments, silica, inorganic salts, among others.

In accordance with a further aspect of the present invention, at least a subset of the above-stated problems is also solved by a system for the at least partial removal of solvent from a suspension comprising microfibrillated cellulose, or for solvent exchange, wherein said system at least comprises the following components:
  microfibrillated cellulose in a solvent, preferably water, wherein the solids content of the microfibrillated cellulose is in the range of 0.1% weight by weight ("w/w")-6% w/w, preferably 1% w/w-5% w/w, further preferably 1.5% w/w-3.5% w/w;
  a substrate for accommodating said microfibrillated cellulose, wherein said substrate is at least partly apertured,
  at least one device for subjecting said microfibrillated cellulose to a vacuum, i.e. a pressure lower than ambient pressure, while the microfibrillated cellulose is accommodated by said substrate.

All aspects and embodiments as described above in regard to the method/process also apply, mutatis mutandis, to the system.

In embodiments, at least one segment of said substrate is capable of rotating at least once by 360 degrees, as further described above in regard to the process.

The system in accordance with the present invention is associated with the advantage of allowing for applying a thin and evenly spread layer of microfibrillated cellulose ("cake"), which further allows flexibility regarding heat and vacuum-profile settings.

In embodiments of the present invention, the system further comprises a container that allows for continuously feeding MFC onto said substrate.

Figure 2:
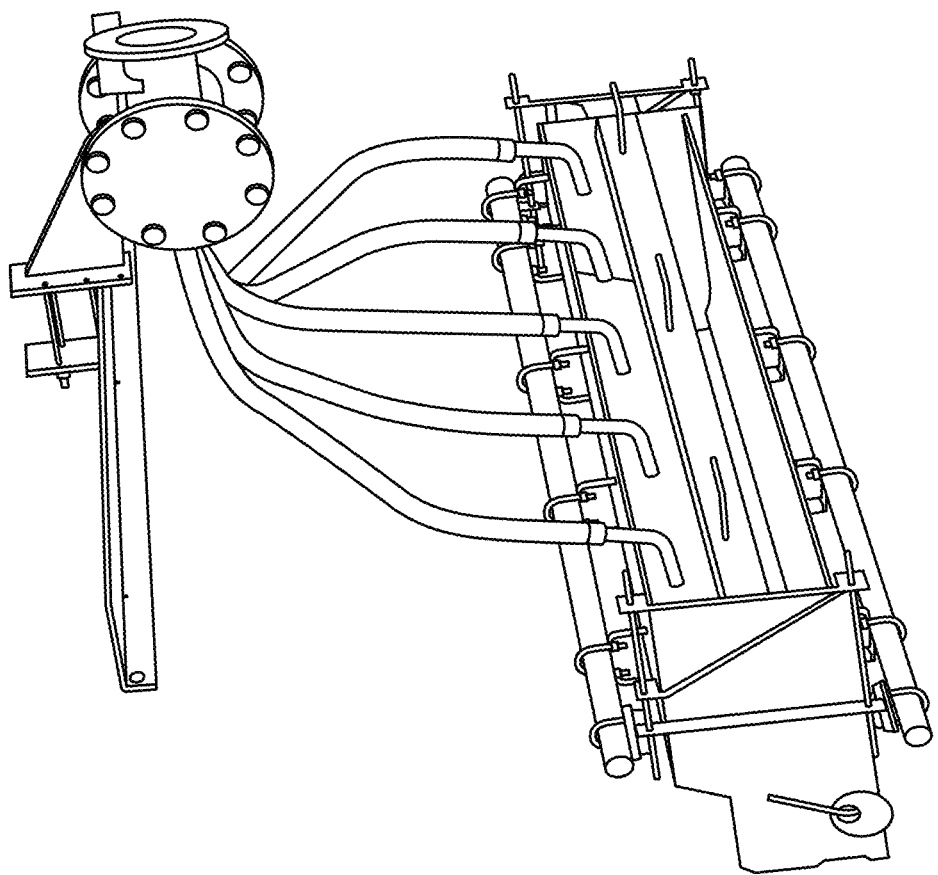

In embodiments, said container is realized as a feeding tray, (see FIGS. 1 and 2).

Figure 4:
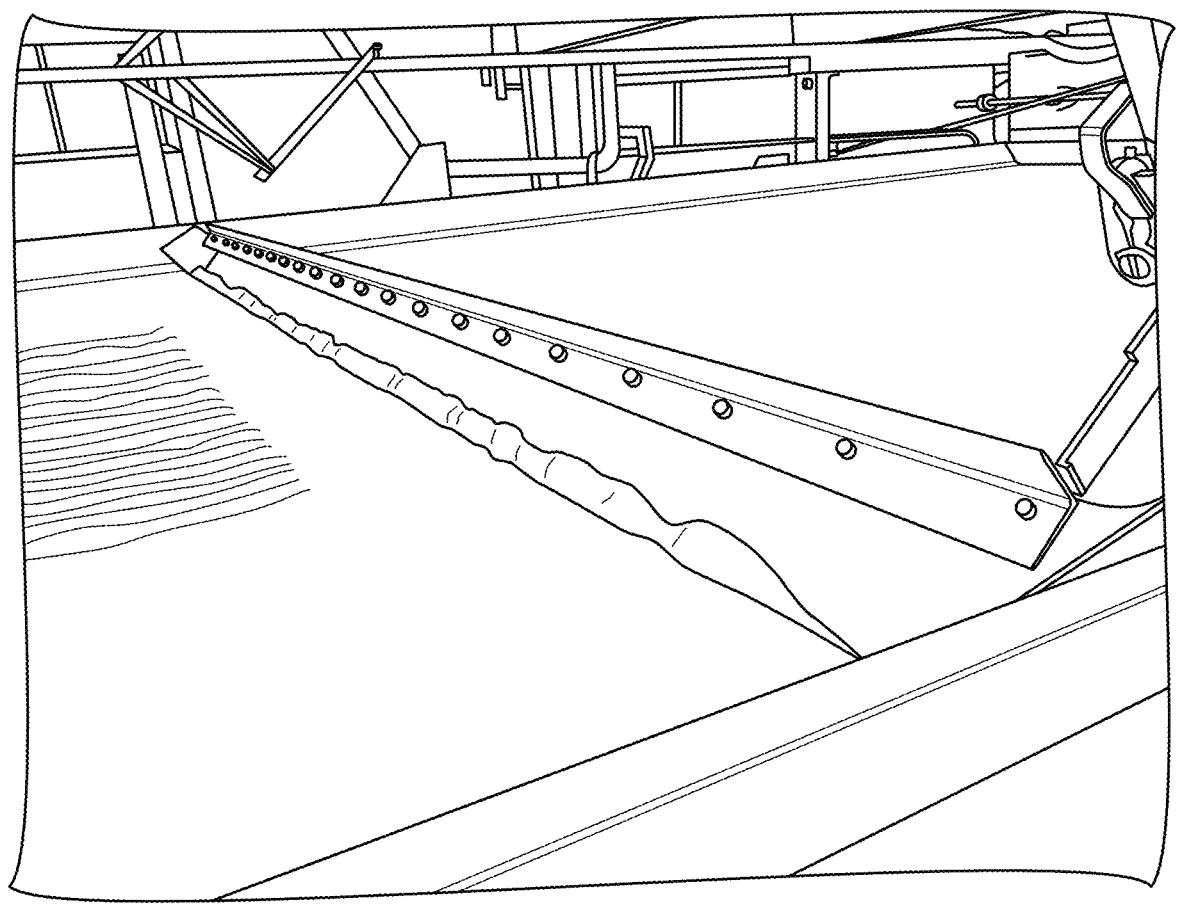

In embodiments of the present invention, the system further comprises at least one device for spreading out microfibrillated cellulose over at least parts of said apertured substrate (see FIG. 4)

In embodiments, the device for spreading out microfibrillated cellulose over at least parts of said apertured substrate is realized as a blade, preferably a rubber blade.

In embodiments of the present invention, the system comprise two or more devices for spreading out microfibrillated cellulose over at least parts of said apertured substrate, preferably two or more rubber blades.

The purpose of this device for spreading out microfibrillated cellulose over at least parts of said apertured substrate is to ensure homogeneous thickness of the microfibrillated cellulose layer and to avoid or minimize holes in the layer (such holes may give rise to unwanted air suction through the apertured substrate, and may lead to a poor vacuum).

Figure 3:
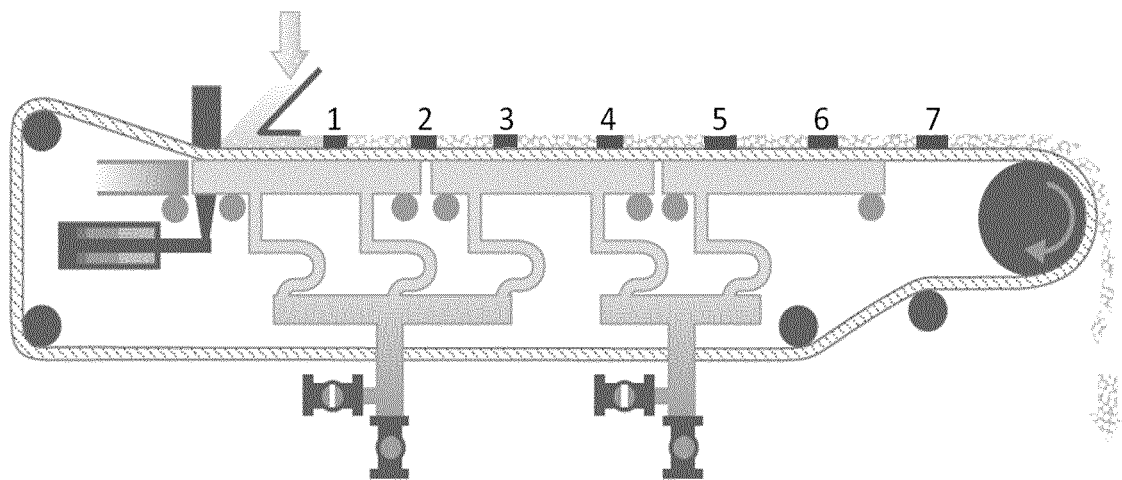

In embodiments of the present invention, the device for subjecting said microfibrillated cellulose as accommodated on said substrate to a vacuum is divided in at least two separate zones that can be separately controlled (see FIG. 3). This embodiment is associated with the advantage of being capably to operate the solvent removal/dewatering step with a vacuum-profile (i.e. varying or different zones of vacuum) along the apertured substrate.

To avoid loss of fibrils through the apertured substrate, it may be advantageous to establish a lower vacuum (i.e. higher absolute pressure) in a first solvent removal zone.

Therefore in preferred embodiments, the device for subjecting said microfibrillated cellulose as accommodated on said substrate to a vacuum comprises two separate zones of a different vacuum, wherein the device can be operated that the vacuum is lower in a first zone, at least by 10%, preferably 50%, preferably 90% than in a second zone.

In embodiments of the present invention, the system further composes a washing device that is capable of at least partly, preferably essentially completely, removing microfibrillated cellulose from at least parts of, preferably essentially all, apertures of the apertured substrate.

The washing system is associated with the advantage that the removal of the fibril-remains inside the apertures (openings) of the apertured substrate, and also potential remains after discharge of MFC paste is facilitated. This is advantageous because remains of fibrils in the apertured substrate may prevent effective solvent removal/dewatering.

All aspects and embodiments as described above in regard to the system also apply, mutatis mutandis, to the method.

DETAILED DESCRIPTION OF THE INVENTION

Figure 5:
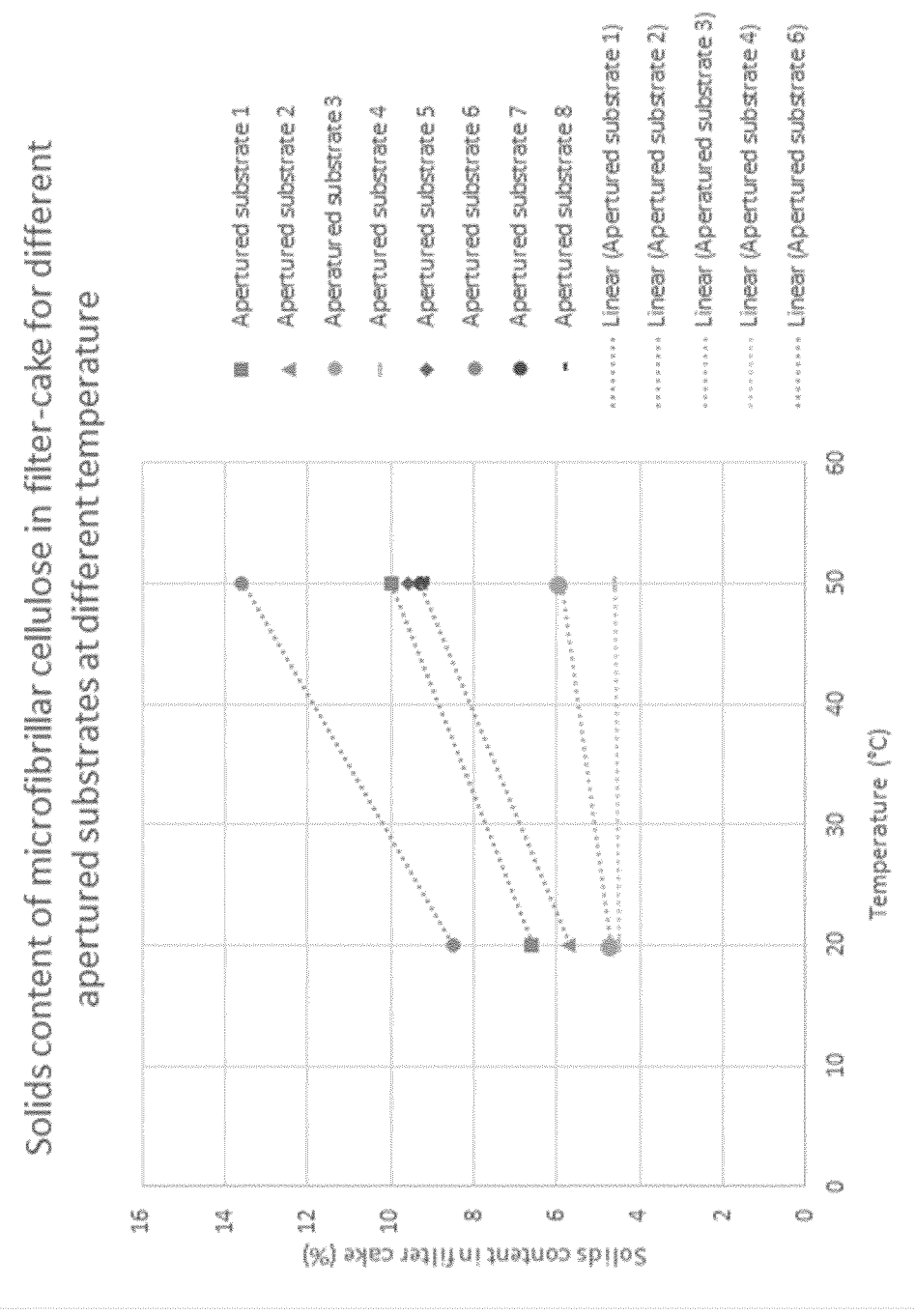
Figure 6:
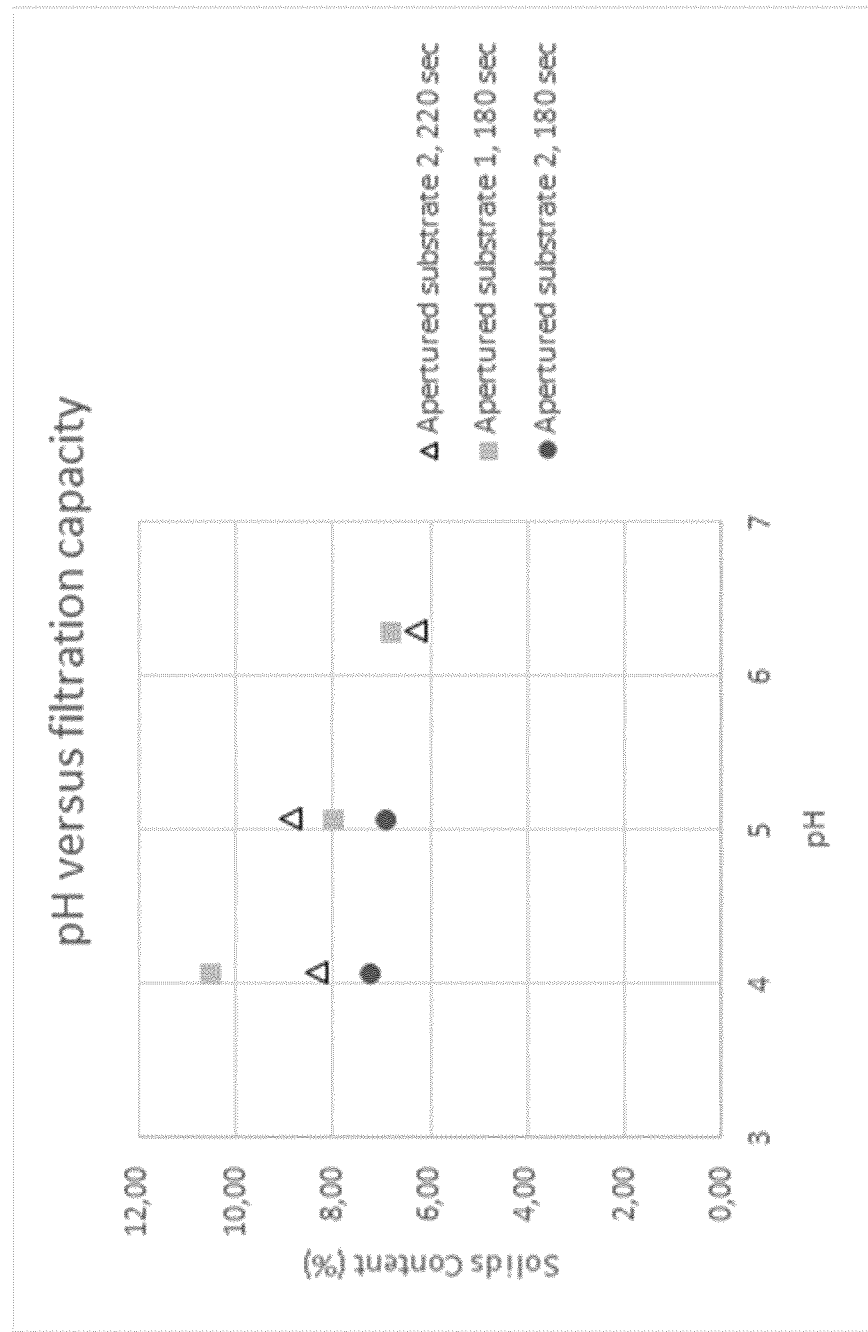
Figure 7:
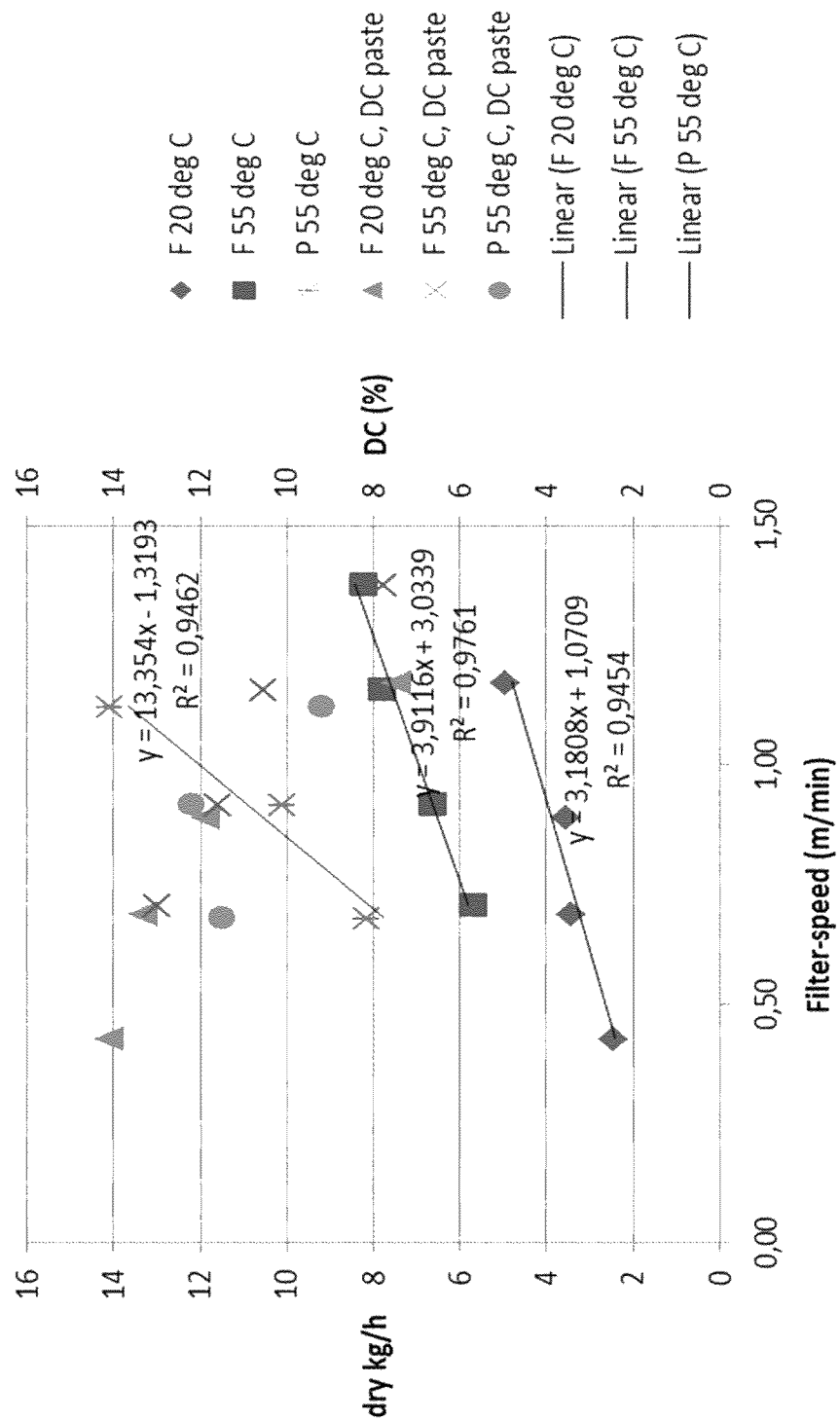

The invention is described in more detail in the following, with reference to the enclosed figures, which are only meant to be illustrative, wherein:

FIG. 1 shows a front view of an exemplary container (tray) for feeding MFC onto the substrate FIG. 2 shows a side view of said exemplary container for feeding MFC onto the substrate, FIG. 3 shows an example of an apertured substrate for accommodating MFC, which is realized as a rotating belt that has apertures so that a vacuum can be effectively applied to the MFC as spread out evenly on the substrate, FIG. 4 shows an example of a device for evenly spreading the MFC on the substrate, in this case a rubber blade, FIG. 5 shows examples for the solids content of the filter cake at different temperatures and for different realizations of the aperture substrate (rotating belt), FIG. 6 shows experimental results how the pH value affects filtering capacity, FIG. 7 shows experimental results for the effect of temperature and quality (grade) of MFC on filtration capacity, in a pilot plant.

In embodiments of the invention, the system comprises a feeding system to feed the MFC to the container.

In embodiments said feeding system comprises a pump, preferably a pump selected from a hose pump, a positive displacement pump or a lobe pump.

In embodiments, the feeding system comprises a pulsation damper, the primary function of which is to avoid pulsations from pump. Pulsations may destabilize application and/or the filtering process.

In embodiments, the feeding system and/or the container comprise(s) a heat exchanger that allows to adjust and to control a predetermined temperature.

In embodiments the present invention, the MFC is kept in a temperature range of from 15° C. to 70° C. in steps (i) through (iii), preferably from 25° C. to 60° C.

These ranges are associated with better flow and increased filterability of the microfibrillated cellulose In embodiments of the present invention, the pH value of the MFC in step (i) is in the range of from 4 to 7.

In embodiments of the present invention, the filling level of the MFC in the container of the system, in particular in the feeding tray is from 25-35%. This level was found to be particularly advantageous for evenly applying MFC onto the substrate "Microfibrillated cellulose" (MFC) in accordance with the present invention is to be understood as relating to cellulose fibers that have been subjected to a mechanical treatment resulting in an increase of the specific surface and a reduction of the size of cellulose fibers, in terms of cross-section (diameter) and/or length, wherein said size reduction preferably leads to "fibrils" having a diameter in the nanometer range and a length in the micrometer range.

In cellulose, which is the starting product for producing microfibrillated cellulose (typically present as a "cellulose pulp"), no, or at least not a significant or not even a noticeable portion of individualized and "separated" cellulose "fibrils" can be found. The cellulose in wood fibres is an aggregation of fibrils. In cellulose (pulp), elementary fibrils are aggregated into microfibrils which are further aggregated into larger fibril bundles and finally into cellulosic fibres. The diameter of wood based fibres is typically in the range 10-50 μm (with the length of these fibres being even greater). When the cellulose fibres are microfibrillated, a heterogeneous mixture of "released" fibrils with cross-sectional dimensions and lengths from nm to μm may result. Fibrils and bundles of fibrils may co-exist in the resulting microfibrillated cellulose.

Microfibrillated cellulose consists of fibrils in constant interaction with each other in a three-dimensional network. The most important performance properties of MFC—high viscosity at rest, shear thinning (thixotropic) behavior, water holding capacity—are a result of the existence of this entangled network.

In the microfibrillated cellulose ('MFC') as described throughout the present disclosure, individual fibrils or fibril bundles can be identified and easily discerned by way of conventional optical microscopy, for example at a magnification of 40×, or by use of electron microscopy In accordance with the present invention, the term "suspension" is understood to mean a liquid, in which solid particles (here: fibers) are dispersed, as generally understood by the skilled person and as defined in the IUPAC "Gold Book" [PAC, 1972, 31, 577, (*Manual of Symbols and Terminology for Physicochemical Quantities and Units, Appendix II: Definitions, Terminology and Symbols in Colloid and Surface Chemistry*); page 606].

The solids content is measured by oven drying (105° C., 16 hours) the MFC as present together with the solvent. At least 30 g of sample is weighed into a pre-weighed aluminum weighing dish. The sample is then dried at 105° C. for 16 hours, which removes the solvent. The aluminum weighing dish with the dried matter is weighed, and dry matter is calculated based on the formula [Weight (dish plus sample after drying)−Weight (dish)]*100%/Weight (sample before drying).

Unless indicated otherwise, any parameter referred to in the present disclosure is measured at standard conditions, i.e. at room temperature (20° C.), ambient pressure (1 bar) and 50% ambient humidity.

Unless indicated otherwise, any ratio given for an amount of component of the overall system is meant to be given in % weight relative to the overall weigh of the content of the composition.

As already indicated above, in principle, any type of microfibrillated cellulose (MFC) may be used in accordance with the present invention, as long as the fiber bundles as present in the original cellulose pulp are sufficiently disintegrated in the process of making MFC so that the average diameter of the resulting fibrils is in the nanometer-range and therefore more surface of the overall cellulose-based material has been created, vis-à-vis the surface available in the original cellulose material. MFC may be prepared according to any of the processes described in the art, including the prior art specifically cited in the "Background"-Section above.

Origin of the Cellulose used to Prepare the MFC

In accordance with the present invention, there is no specific restriction in regard to the origin of the cellulose, and hence of the microfibrillated cellulose. In principle, the raw material for the cellulose microfibrils may be any cellulosic material, in particular wood, annual plants, cotton, flax, straw, ramie, bagasse (from sugar cane), suitable algae, jute, sugar beet, citrus fruits, waste from the food processing industry or energy crops or cellulose of bacterial origin or from animal origin, e.g. from tunicates.

In a preferred embodiment, wood-based materials are used as raw materials, either hardwood or softwood or both (in mixtures). Further preferably softwood is used as a raw material, either one kind or mixtures of different soft wood types. Bacterial microfibrillated cellulose is also preferred, due to its comparatively high purity.

Modified (Derivatized) and Non-Modified (Un-Derivatized) Cellulose/MFC

In principle, the microfibrillated cellulose in accordance with the present invention may be unmodified in respect to its functional groups or may be physically modified or chemically modified, or both.

Chemical modification of the surface of the cellulose microfibrils may be achieved by various possible reactions of the surface functional groups of the cellulose microfibrils and more particularly of the hydroxyl functional groups, preferably by: oxidation, silylation reactions, etherification reactions, condensations with isocyanates, alkoxylation reactions with alkylene oxides, or condensation or substitution reactions with glycidyl derivatives. Chemical modification may take place before or after the defibrillation step.

The cellulose microfibrils may, in principle, also be modified by a physical route, either by adsorption at the surface, or by spraying, or by coating, or by encapsulation of the microfibril. Preferred modified microfibrils can be obtained by physical adsorption of at least one compound. The MFC may also be modified by association with an amphiphilic compound (surfactant).

However, in preferred embodiments, the microfibrillated cellulose is not physically modified.

In a preferred embodiment of the present invention, the microfibrillated cellulose is prepared by a process, which comprises at least the following steps:
  (a) subjecting a cellulose pulp to at least one mechanical pretreatment step;
  (b) subjecting the mechanically pretreated cellulose pulp of step (a) to a homogenizing step, which results in fibrils and fibril bundles of reduced length and diameter vis-à-vis the cellulose fibers present in the mechanically pretreated cellulose pulp of step (a), said step (b) resulting in microfibrillated cellulose;
  wherein the homogenizing step (b) involves compressing the cellulose pulp from step (a) and subjecting the cellulose pulp to a pressure drop.

The mechanical pretreatment step preferably is or comprises a refining step. The purpose of the mechanical pretreatment is to "beat" the cellulose pulp in order to increase the accessibility of the cell walls, i.e. to increase the surface area.

Prior to the mechanical pretreatment step, or in addition to the mechanical pretreatment step, enzymatic (pre)treatment of the cellulose pulp is an optional additional step that may be preferred for some applications. In regard to enzymatic pretreatment in conjunction with microfibrillating cellulose, the respective content of WO 2007/091942 is incorporated herein by reference. Any other type of pretreatment, including chemical pretreatment is also within the scope of the present invention.

In the homogenizing step (b), which is to be conducted after the (mechanical) pretreatment step, the cellulose pulp slurry from step (a) is passed through a homogenizer at least once, preferably at least two times, as described, for example, in PCT/EP2015/001103, the respective content of which is hereby incorporated by reference.

In embodiments of the invention, microfibrillated cellulose as dewatered according to any one of the embodiments described above is used in a wide variety of applications, including but not limited to coatings, adhesives, (surface) sizes, paints, inks, de-icing fluids or additives, thixotropic additives, emulsifier/emulsion aid; viscosity adjustment, additive in oil field applications, in particular drilling fluids, in home care/personal care/personal hygiene applications, cosmetics and pharmaceutical applications, in particular in ointments, emulsions or high viscosity liquids, as an additive or aid in medical devices or medical applications, in particular scar and wound care, agrochemicals, food applications, for example as thickener, dietary supplement, non-caloric additive, emulsifier etc., in printing applications, including 3-D printing, in composite materials, for example plastics, rubber or paper-based materials, cardboards etc., in or as porous material, foam or aerogel/hydrogel; in separation technologies, including filter elements, membranes, separators etc., in film forming applications, in battery technology and/or flexible electronics, in textile application and/or as filaments, including yarns, non-wovens, meshes etc., as an additive or adjuvant in construction commodities, including cement, concrete, gypsum boards, and the like.

EXAMPLES

Example 1

Preparation of Microfibrillated Cellulose

MFC is commercially available and commercialized as "Exilva", based on cellulose pulp from Norwegian spruce (softwood). The starting solids content of microfibrillated cellulose for the the solvent removal was 2%.

MFC was provided in two different qualities, named Microfibrillated cellulose P and Microfibillated cellulose F. The differences between Microfibrillated cellulose P and Microfibrillated cellulose F are related mainly to the size of the aggregates of microfibrils and consequently to the 3D-network properties. Microfibillated cellulose "F" has higher Brookfield viscosity, surface area (water retention) and higher tensile strength than Microfibillated cellulose "P". While these differences have no relevance for the working of the present invention, removing solvent from these two different microfibrillated cellulose materials shows that the method according to the present invention works for different "qualities" of microfibrillated cellulose.

Example 2

Solvent Removal (Dewatering) of 2% MFC "F" in a Laboratory-Scale System in Accordance with the Invention 2% MFC "F" was tempered in heating cabinets overnight.

FIG. 5 shows how the selection of the apertured substrate (belt) and temperature influence the filtration capacity.

In particular examples, the following apertured substrates were tested: Valmet S5111-L1, Valmet 52121-L2K2, Safar Tetex DLW 07-8435-SK010, Maro S35, Maro S25.

Vacuum set to 450 mbar
Filtration time 220 sec
Filter-cake thickness: 6-7 mm (ca 70 g)
Dry content measured after drying cake in heating cabinet 105° C.

Filtrate was visually observed, and yield calculated from dry content measurements, which showed that there had been no discernible loss of fibrils through the substrate.

Example 3

Influence of pH on Filtration Capacity

FIG. 6 shows how the selection of the pH affects filtration capacity Solvent removal (dewatering) of 2% MFC "F" in a laboratory-scale set-up. 2% MFC "F" was tempered in heating cabinets over night Vacuum set to 450 mbar
Aperture substrates tested: Valmet S4152-I2K2 and Valmet S4152-L2K2-M7
Filtration time 180 and 220 sec
Filter-cake 6-7 mm (ca 70 g)
Dry content measured after drying cake in heating cabinet 105° C.

Filtrate was visually observed, and yield calculated from dry content measurements, which showed that there had been no discernible loss of fibrils through the substrate.

Example 4

Influence of Quality of MFC and Temperature on Filtration Capacity

FIG. 7 shows how temperature and quality (MFC "P" versus MFC "F") affect the solvent removal capacity. (in pilot plant).

Removing solvent (water) from two MFC grades "P" (less fibrillated) and "F" (more fibrillated).

Solvent removal with pilot filter in pilot plant.

Aperture substrate used in this experiment: Maro S50

Temperatures: 20° C. and 55° C. for "F" and 55° C. for "P".

Filter apertured substrate speed 0.4-1.4 m/min.

Dry content of dewatered microfibillated cellulose measured with drying in heating cabinet Amount of dry microfibillated cellulose calculated from dry content multiplied with weight of product after removing solvent with filter.

The invention claimed is:

1. A process for at least partial removal of solvent from a suspension comprising microfibrillated cellulose, wherein solids content of the microfibrillated cellulose increases, during said at least partial removal of solvent, from a first solids content of microfibrillated cellulose in a range of from 0.1% weight by weight ("w/w") to 6% w/w up to a second solids content of microfibrillated cellulose of 5% w/w or above, wherein the second solids content is higher than the first solids content, wherein said process comprises at least the following steps:
   (i) providing microfibrillated cellulose in a solvent wherein the solids content of microfibrillated cellulose is in a range of 0.1% weight by weight ("w/w")–6% w/w; and
   (ii) applying said microfibrillated cellulose from step (i) onto an at least partly apertured substrate as a layer and subjecting the microfibrillated cellulose, while applied onto said apertured substrate, to a vacuum that is a pressure that is reduced vis-a-vis a respective ambient pressure, wherein the layer of microfibrillated cellulose is applied to a top side of the at least partly apertured substrate and the vacuum is applied to the layer from underneath the at least partly apertured substrate, and
   (iii) rotating at least one segment of the at least partly apertured substrate at least once by 360 degrees, thereby removing microfibrillated cellulose of an increased solids content from the apertured substrate, wherein a thickness of the layer of microfibrillated cellulose, after step (ii), is in a range of from 1 mm to 200 mm.

2. A process for at least partial exchange of solvent in a suspension comprising microfibrillated cellulose, wherein said process comprises at least the following steps:
   (i) providing microfibrillated cellulose in a first solvent, wherein a solids content of microfibrillated cellulose is in a range of 0.1% weight by weight ("w/w")–6% w/w;
   (ii) applying said microfibrillated cellulose from step (i) onto an at least partly apertured substrate as a layer and subjecting the microfibrillated cellulose, while applied onto said apertured substrate, to a vacuum that is a pressure that is reduced vis-a-vis a respective ambient pressure, wherein a thickness of the layer of microfibrillated cellulose, after step (ii), is in a range of from 1 mm to 200 mm, wherein the layer of microfibrillated cellulose is applied to a top side of the at least partly apertured substrate and the vacuum is applied to the layer from underneath the at least partly apertured substrate; and
   (iii) adding at least one second solvent to the mixture of step (ii), during or after step (ii), wherein said second solvent is different from the first solvent of step (i), and
   (iv) rotating at least one segment of the at least partly apertured substrate at least once by 360 degrees, thereby removing microfibrillated cellulose of an increased solids content from the apertured substrate.

3. The process according to claim 1, wherein the at least partial removal of solvent from a suspension comprising microfibrillated cellulose includes a dewatering of the microfibrillated cellulose that includes a removal of water or of a solvent comprising at least 90% of water.

4. The process according to claim 1, wherein, the vacuum as applied in step (ii) is from 0.1 mbar to 800 mbar.

5. The process according to claim 1, wherein said rotating substrate is realized as a rotating belt.

6. The process according to claim 1, wherein the substrate continuously rotates at least 5 times in step (iii).

7. The process according to claim 1, wherein a solvent/water retention capacity of the microfibrillated cellulose after step (iii) is at least 70% of the solvent/water retention capacity of the microfibrillated cellulose as initially provided in step (i).

8. The process according to claim 1, wherein said microfibrillated cellulose comprises fibrils having a diameter in a nanometer range and a length in a micrometer range.

9. The process according to claim 1, wherein the microfibrillated cellulose is prepared by a process, which comprises at least the following steps:
   (a) subjecting a cellulose pulp to at least one mechanical pretreatment step;
   (b) subjecting the mechanically pretreated cellulose pulp of step (a) to a homogenizing step, which results in fibrils and fibril bundles of reduced length and diameter vis-a-vis cellulose fibers present in the mechanically pretreated cellulose pulp of step (a), said step (b) resulting in microfibrillated cellulose;
   wherein the homogenizing step (b) involves compressing the cellulose pulp from step (a) and subjecting the cellulose pulp to a pressure drop.

10. The process according to claim 7, wherein the microfibrillated cellulose, after step (iii) has a solvent/water retention capacity of 40-250.

11. The process according to claim 8, wherein the microfibrillated cellulose is not physically modified.

* * * * *